US007654661B2

(12) United States Patent
Kida et al.

(10) Patent No.: US 7,654,661 B2

(45) Date of Patent: *Feb. 2, 2010

(54) IMAGE FORMING METHOD

(75) Inventors: Shuji Kida, Iruma (JP); Shinichi Suzuki, Saitama (JP); Hidenobu Ohya, Hachioji (JP); Makoto Kaga, Hachioji (JP); Teruyuki Fukuda, Hachioji (JP)

(73) Assignee: Konica Minolta Holdings, Inc., Tokyo (JP)

( * ) Notice: Subject to any disclaimer, the term of this patent is extended or adjusted under 35 U.S.C. 154(b) by 147 days.

This patent is subject to a terminal disclaimer.

(21) Appl. No.: 11/895,595

(22) Filed: Aug. 24, 2007

(65) Prior Publication Data

US 2008/0002009 A1 Jan. 3, 2008

Related U.S. Application Data

(62) Division of application No. 10/486,213, filed as application No. PCT/JP02/07520 on Jul. 25, 2002, now Pat. No. 7,273,276.

(30) Foreign Application Priority Data

Aug. 8, 2001 (JP) ............................ 2001-240509

(51) Int. Cl.
*C09D 11/00* (2006.01)

(52) U.S. Cl. .................................... 347/100; 106/31.13

(58) Field of Classification Search ................ 347/100; 106/31.13

See application file for complete search history.

(56) References Cited

U.S. PATENT DOCUMENTS

| | | | | |
|---|---|---|---|---|
| 6,464,348 | B1 * | 10/2002 | Kasperchik et al. | 347/101 |
| 6,503,307 | B1 * | 1/2003 | Noguchi | 106/31.27 |
| 2002/0027587 | A1 | 3/2002 | Sugaya et al. | |

FOREIGN PATENT DOCUMENTS

| | | | |
|---|---|---|---|
| EP | 1016544 | A2 | 7/2000 |
| JP | 59-196285 | A | 11/1984 |
| JP | 59-201891 | A | 11/1984 |
| JP | 02-31673 | B2 | 7/1990 |
| JP | 2000-239585 | A | 9/2000 |
| JP | 2001-10215 | A | 1/2001 |
| JP | 2001-171095 | A | 6/2001 |
| JP | 2001-199155 | A | 7/2001 |
| WO | WO 00/06390 | A1 | 2/2000 |

* cited by examiner

*Primary Examiner*—Manish S Shah
*Assistant Examiner*—Laura E Martin
(74) *Attorney, Agent, or Firm*—Frishauf, Holtz, Goodman & Chick, P.C.

(57) ABSTRACT

An image forming method in which after recording by ejecting ink on an ink-jet recording medium containing a thermoplastic resin in the surface layer, a fixing process to fuse said thermoplastic resin or make it into a film is provided, wherein a colorless or white liquid is supplied on said ink-jet recording medium before the fixing process.

8 Claims, No Drawings

IMAGE FORMING METHOD

This application is a divisional of application Ser. No. 10/486,213 filed Feb. 5, 2004 now U.S. Pat. No. 7,273,276 (now allowed), which is a 371 of PCT/JP/02/07520 filed Jul. 25, 2002,which is incorporated herein in its entirety by this reference.

TECHNICAL FIELD

The present invention relates to an image forming method employing ink-jet, and particularly to an image forming method employing ink-jet which results in improved glossiness of a white background without deterioration of image quality.

BACKGROUND

In recent years, ink-jet techniques have made remarkable progress resulting in being designated as having photographic image quality together with printer techniques, ink techniques and exclusive recording medium techniques. In accordance with the improvement of image quality, storage stability of ink-jet images has come to be compared with that of silver salt photography, and pointed out are deterioration such as poor bleeding resistance due to migration of a colorant and deterioration such as poor light-fastness and oxidizing gas resistance due to a chemical reaction characteristic to the colorants.

Many proposals have been made to improve the storage stability of dye ink images. As for an recording medium, as disclosed in Japanese Patent Publication No. 2-31673, achieved is improvement of water-fastness and weatherproofing as well as provision of image glossiness, by after providing a layer comprising thermoplastic organic polymer particles on the outermost surface of a recording medium, the thermoplastic organic polymer particles are fused to be formed into a film, resulting in providing a polymer protective layer.

However, on the other hand, ink absorption rate is significantly decreased compared to a porous recording medium mainly comprised of an inorganic pigment when a layer comprising thermoplastic organic polymer particles on the surface layer is provided. Decreased ink absorption rate causes color bleed or beading resulting in deterioration of image quality. Particularly, in recent years, the deterioration of image quality is a big problem, because speed of printers has become faster to answer the demand of high-speed printing.

Images formed by this method can achieve relatively high glossiness, however, they are still insufficient when compared with those of silver salt photography, in addition, are unfavorable because of unnatural appearance due to such as insufficient uniformity of images, lift of images at the boundary between a high density portion and a white background area. Particularly, this phenomenon is significant when pigment ink is employed or thermal fixing is performed without appropriate intervals after printing for faster image formation. To overcome these drawbacks, increasing thermoplastic organic polymer particles in the surface layer is effective, however, problems cannot be solved because of furthermore decrease of said ink absorption rate.

It is the present state that a recording medium provided with a layer comprising thermoplastic organic polymer particles on the surface layer exhibits effects of improving storage stability of images and providing glossiness by thermal fixing after printing, however there may be caused deterioration of image quality due to decreased ink absorption rate or unnatural impression of images due to image density differences, and urgent improvement is still required.

An objective of the present invention is to provide an image forming method employing ink-jet, which results in improved glossiness of a white background without deterioration of image quality nor ink absorption rate.

SUMMARY OF THE INVENTION

The aforesaid objective of the present invention is achieved employing each of the following means.

(1) An image forming method in which after recording by ejection of ink on an ink-jet recording medium containing a thermoplastic resin in the surface layer, provided is a fixing process to fuse said thermoplastic resin or form it into a film, characterized in that a colorless or white liquid is supplied on said ink-jet recording medium before the fixing process.

(2) The image forming method described in item (1) above, wherein a colorless or white liquid is supplied on the portion having an image density of not more than 0.5.

(3) The image forming method described in item (1) above, wherein a colorless or white liquid is supplied only on the non-printed portion.

(4) The image forming method described in item (1) above, wherein a colorless or white liquid contains a thermoplastic resin.

(5) The image forming method described in item (1) above, wherein a colorless or white liquid contains a water-soluble organic solvent.

(6) The image forming method described in item (1) above, wherein a colorless or white liquid is supplied employing an ink-jet nozzle.

(7) The image forming method described in item (1) above, wherein utilized is an ink-jet recording medium provided with an ink absorbing layer comprising a thermoplastic resin and an inorganic pigment on the surface layer, and an ink absorbing layer comprising mainly an inorganic pigment under said layer are utilized.

(8) The image forming method described in item (1) above, wherein ink is pigment ink.

(9) The image forming method described in item (1) above, wherein a nozzle for recording ink and a nozzle for supplying a colorless or white liquid are prepared and recording ink and a colorless or white liquid are simultaneously ejected from the nozzles.

(10) The image forming method described in item (1) above, wherein the maximum amount of the total of recording ink and a colorless or white liquid ejected on a unit area is less than 26 $ml/m^2$.

(11) The image forming method described in item (1) above, wherein the minimum amount of the total of recording ink and a colorless or white liquid ejected on a unit area is less than 2 $ml/m^2$.

(12) The image forming method described in item (1) above, wherein a recording medium is transferred to a fixing process within 5 minutes after a colorless or white liquid is supplied.

(13) The image forming method described in item (1) above, wherein an absorbance change relative to the absorbance immediately after mixing is less than 5% when recording ink and a colorless or white liquid are mixed.

(14) The image forming method described in item (1) above, wherein the ink drop volume of a colorless or white liquid is larger than that of recording ink in the case of supplying a colorless or white liquid employing an ink-jet nozzle.

DESCRIPTION OF THE PREFERRED EMBODIMENTS

The present invention will be detailed in the following.

The inventors of this invention have found as a result of intensive study, as described in item (1) above, that an image forming method in which provided is a fixing process by which after recording on an ink-jet recording medium containing a thermoplastic resin in the surface layer, and said thermoplastic resin is fused or made into a film, wherein glossiness of the white background was improved without deterioration of image quality and ink absorption rate by supplying a colorless or white liquid (hereinafter, also simply referred to as a liquid) on an ink-jet recording medium before the fixing process.

To exhibit the effects of this invention more effectively, as described in items (2)-(14), it has been found to be preferable to specify the portion of an ink-jet recording medium on which a liquid is supplied, the composition of a liquid, the supplying method of a liquid, the layer constitution of an ink-jet recording medium and the type of ink.

[Ink-jet Recording Medium]

Next, an ink-jet recording medium utilized in this invention will be explained.

A recording medium is required to contain a thermoplastic resin in the surface layer. As for other points, there is no restriction provided that ink is acceptable and images can be formed, however, it is preferable to utilize a support on which an ink absorbing layer is provided with respect to strength.

(Support)

As a support, can be utilized are supports conventionally utilized as an ink-jet recording medium, for example, paper supports such as plain paper, art paper, coat paper and cast-coat paper, plastic supports, a paper support both surfaces of which are covered with polyolefin and complex supports in which these are laminated each other.

For the purposes of such as to increase adhesion strength between a support and an ink absorbing layer, it is preferable to perform such as a corona discharge treatment and under-coating treatment in advance to coating of the ink absorbing layer. Further, a recording medium is not necessarily colorless and may be colored. It is also specifically preferable to utilize a paper support both surfaces of which are laminated with polyethylene to obtain recorded images having image quality similar to that of photography as well as images of high quality at low cost.

Such polyethylene laminated paper support will be explained in the following.

Base paper utilized in a paper support is wood pulp as a primary raw material, and paper supports are made into paper by appropriately adding synthetic pulp such as polypropylene or synthetic fiber such as nylon and polyester in addition to wood pulp. As wood pulp, for example, can be utilized is any of LBKP, LBSP, NBKP, NBSP, LDP, NDP, LUKP and NUKP, however, it is preferable to utilize more LBKP, NBSP, LBSP, NDP and LDP which are rich in short fiber. Herein, the content of LBSP or LDP is preferably 10-70 weight %.

As above-described pulp, chemical pulp (such as sulfate pulp and sulfite pulp) containing few impurities is preferably utilized and pulp subjected to a bleaching treatment to enhance whiteness is also useful.

Additives which can be appropriately added in base paper are, for example, sizing agents such as a higher fatty acid and an alkylketene dimer, white pigments such as calcium carbonate, talk and titanium oxide, paper strength enhancing agents such as starch, polyacrylamide and polyvinyl alcohol, fluorescent brightening agents, moisture-retaining agents such as a polyethylene glycol series, dispersants, and softening agents such as quaternary ammonium.

The freeness of pulp utilized in paper making is preferably 200-500 ml based on the definition of CSF, and the length of fiber after beating is preferably 30-70% based on the sum weight % of a 24 mesh residue and a 42 mesh residue, defined by JIS-P-8207. Herein, the weight % of a 4 mesh residue is preferably at most 20 weight %.

The basis weight of base paper is preferably 30-250 g and specifically preferably 50-200 g. The thickness of base paper is preferably 40-250 μm.

Base paper may be provided with high smoothness by being subjected to a calendar treatment, during or after the paper making stage. The raw paper density is generally 0.7-1.2 $g/m^2$ (JIS-P-8118). Further, the base paper rigidity is preferably 20-200 g at conditions defined in JIS-P-8143.

A surface sizing agent may be coated on the surface of base paper, and utilized as a surface sizing agent can be sizing agents such as a higher fatty acid and an alkylketene dimer which can be added in the above-described base paper. The pH of base paper is preferably 5-9 when being measured by a hot water extraction method defined in JIS-P-8113.

Polyethylene which covers the front and back surfaces is primarily law density polyethylene (LDPE) and/or high density polyethylene (HDPE), however other polyethylene such as LLDPE and polypropyrene can be partly utilized.

Particularly, a polyethylene layer on the ink absorbing layer side is preferably one opacity and whiteness of which having been improved by adding titanium oxide of rutile or anatase type in polyethylene as is commonly utilized in photographic print paper. The content of titanium oxide is generally 3-20 weight % and preferably 4-13 weight %.

Polyethylene covered paper can be utilized as glossy paper as well as paper provided with a matte surface or silky surface such as obtained with conventional photographic print paper, which can be prepared by a so-called embossing treatment when polyethylene is coated by melting extrusion on the base paper surface.

The using amounts of polyethylene on the front and back surfaces of base paper are selected so as to optimize curl under low and high humidity, and, generally, are in a range of 20-40 μm for a polyethylene layer of the porous layer side and 10-30 μm for that of the back layer side.

Further, the above-described polyethylene covered paper support is preferably provided with the following characteristics.

1. Tensile strength in the longitudinal direction is preferably 2-30 kg and in the lateral direction is 1-20 kg in terms of strength specified in JIS-P-8113.

2. Tear strength in the longitudinal direction is preferably 10-200 g and in the lateral direction is 20-200 g in terms of strength specified in JIS-P-8116.

3. Compressive elastic modulus is preferably at least 98.1 MPa.

4. Surface Beck smoothness is preferably at shortest 20 seconds as a glossy surface under the conditions defined in JIS-P-8119,however, may be shorter than this as so-called embossed products.

5. A surface mean roughness specified in JIS-B-0601 is at most 10 μm based on the maximum height per a standard length of 2.5 mm.

6. Opacity is preferably at least 80% and specifically preferably 85-98%, when being measured employing the method specified in JIS-P-8138.

7. Whiteness: L*, a* and b* in terms of whiteness specified in JIS-Z-8729 are each preferably 80-95, −3-+5 and −6-+2.

8. Surface glossiness (at 60-degree specular glossiness) in terms of glossiness specified in JIS-Z-8741 is 10-95%.

9. Clark stiffness is preferably 50-300 $cm^2$/100 in the transfer direction of the recording sheet.

10. Water content of the center stock is generally 2-100 weight % and preferably 2-6 weight %, vs. center stock.

(Ink Absorbing Layer)

An ink absorbing layer of a recording medium may be constituted of either one layer or two or more layers. Specifically, it is preferable to utilize an ink-jet recording medium having an ink absorbing layer comprising two layers; the first layer of which is an ink absorbing layer on a support containing an inorganic pigment described below, and the second layer of which is an ink absorbing layer thereon containing a thermoplastic resin and an inorganic pigment described below.

An ink absorbing layer of a recording medium is roughly divided into a swelling type and a porous type.

As a swelling type, utilized can be an ink absorbing layer which is prepared by coating, for example, such as gelatin, polyvinyl alcohol, polyvinyl pyrrolidone or polyethylene oxide, alone or in combination.

As a porous type, preferable is a layer which is prepared by coating the mixture of micro-particles and a hydrophilic binder and specifically has glossiness. As micro-particles, alumina or silica is preferred and silica having a particle size of at most 0.1 μm is specifically preferred. As a hydrophilic binder, preferably utilized is, for example, such as gelatin, polyvinyl alcohol or polyethylene oxide, alone or in combination.

To provide adaptability to continuous or high speed printing, a higher ink absorbing rate of a recording medium is preferred and specifically preferred is to utilize a porous type with this respect.

A porous type ink-absorbing layer will be further detailed below.

A porous layer is formed primarily by weak coagulation of a hydrophilic binder and an inorganic pigment. Heretofore, various methods to form voids in film are known, for example: a method to form voids with phase separation of polymers mutually during the drying process, after application of a uniform coating composition containing at least two polymers onto a support; a method to form voids with dissolution of solid micro-particles by soaking an ink-jet recording medium in water or an appropriate organic solvent after coating and drying of the coating composition containing solid micro-particles and a hydrophilic binder or hydrophobic binder, onto a support; a method to form voids in film with foaming of the material during the drying process after application of the coating composition containing a compound having the capability to foam during film formation; a method to form voids in porous micro-particles or among micro-particles with coating of the coating composition containing porous solid micro-particles and a hydrophilic binder on a support; a method to form voids among solid micro-particles with coating of the coating composition containing solid micro-particles and/or micro-particle oil drops having a volume of more than or equivalent to that of the hydrophilic binder onto a support. In this invention, specifically preferred is to form voids with containing various inorganic solid micro-particles of an average particle size of at most 100 nm in the porous layer.

Inorganic pigments utilized for the above purpose include, for example, white inorganic pigments such as light calcium carbonate, heavy calcium carbonate, magnesium carbonate, kaolin, clay, talk, calcium sulfate, barium sulfate, titanium dioxide, zinc oxide, zinc hydroxide, zinc sulfide, zinc carbonate, hydrotalcite, aluminum silicate, diatomaceous earth, calcium silicate, magnesium silicate, synthetic amorphous silica, colloidal silica, alumina, colloidal alumina, pseudo boehmite, aluminum hydroxide, lithopon, zeolite, and magnesium hydroxide.

The average particle diameter of an inorganic pigment is determined by observing particles themselves or particles appeared on the cross-section or surface of a porous layer through an electron-microscope and measuring particle diameters of arbitrary 1,000 particles to determine the simple average (the number average) thereof. Herein, each particle diameter is represented by the diameter of a supposed circle having the same projection area of the particle.

As solid micro-particles preferably utilized are those selected from silica, alumina or alumina hydrate and specifically preferably silica.

Silica synthesized with a typical wet method, colloidal silica and silica synthesized with a gas phase method may be employed as usable silica, and specifically preferably utilized is colloidal silica, or micro-particle silica synthesized with a gas phase method, and preferable among them is micro-particle silica synthesized with a gas phase method because a high void ratio can be obtained as well as coarse coagulates are hardly formed when being added into a cationic polymer for the purpose of fixing dyes. Further, alumina or alumina hydrate may be either crystalline or amorphous, and optional shapes of undetermined form, spherical particles or needle shaped particles may be utilized.

Micro-particles are preferably in a state that the micro-particle dispersion solution before being mixed with a cationic polymer is dispersed into primary particles.

The particle diameter of an inorganic pigment is preferably at most 100 nm. For example, in the case of micro-particle silica with a gas phase method described above, the average particle diameter of primary particles of an inorganic pigment, which are dispersed in a state of primary particles, is preferably at most 100 nm, more preferably 4-50 nm and most preferably 4-20 nm.

As most preferably utilized silica which is synthesized with a gas phase method and has an average primary particle diameter of 4-20 nm, for example, Aerosil, manufactured by Nippon Aerosil Co., Ltd., is commercially available on the market. The micro-particle silica by a gas phase method can be relatively easily dispersed into primary particles in water using such as Jet-stream Inductor Mixer produced by Mitamura Riken Kogyo Co., Ltd., employing suction dispersion.

Hydrophilic binders include, for example, polyvinyl alcohol, gelatin, polyethylene oxide, polyvinyl pyrrolidone, polyacrylic acid, polyacrylamide, polyurethane, dextran, dextrin, carrageenan (such as κ, τ, λ), agar, pullulan, water-soluble polyvinyl butyral, hydroxyethyl cellulose and carboxymethyl cellulose. These water-soluble resins may be utilized in combination of two or more kinds.

A water-soluble resin preferably utilized in this invention is polyvinyl alcohol. Polyvinyl alcohols preferably employed in this invention include common polyvinyl alcohol prepared by hydrolyzing polyvinyl acetate, and in addition, modified polyvinyl alcohols such as terminal cation-modified polyvinyl alcohol and anion-modified polyvinyl alcohol having an anionic group.

The average degree of polymerization of polyvinyl alcohol prepared by hydrolyzing vinyl acetate is preferably 1,000 or more, and is specifically preferably 1,500-5,000. The saponification ratio is preferably 70-100% and is specifically preferably 80-99.5%.

Cation-modified polyvinyl alcohols are, for example, polyvinyl alcohols having a primary to a tertiary amino group, or a quaternary ammonium group on the main chain or side chain of the foregoing polyvinyl alcohols, as described in JP-A No. 61-10483 (hereinafter, JP-A refers to Japanese Patent Publication Open to Public Inspection), and are obtained upon saponification of a copolymer of an ethylenic unsaturated monomers having a cationic group and vinyl acetate.

Ethylenic unsaturated monomers having a cationic group include, for example, trimethyl-(2-acrylamido-2,2-dimethylethyl)ammonium chloride, trimethyl-(3-acrylamido-3,3-dimethylpropyl)ammonium chloride, N-vinylimidazole, N-vinyl-2-methylimidazole, N-(3-dimethylaminopropyl) methacrylamide, hydroxyethyltrimethylammonium chloride, trimethyl-(2-methacrylamidepropyl)ammonium chloride and N-(1,1-dimethyl-3-dimethylaminopropyl) acrylamide.

The content ratio of monomers containing a cation-modified group of the cation-modified polyvinyl alcohol is 0.1-10.0 mol % to the vinyl acetate, and is preferably 0.2-5.0 mol %.

Anion modified polyvinyl alcohols include, for example, polyvinyl alcohols having an anionic group as described in JP-A No. 1-206088,copolymers of vinyl alcohols and a vinyl compounds having a water-solubilizing group as described in JP-A Nos. 61-237681 and 63-3079799,and modified polyvinyl alcohols having a water-solubilizing group as described in JP-A No. 7-285265.

Further, nonion-modified polyvinyl alcohols include, for example, polyvinyl alcohol derivatives in which a polyalkylene oxide group is added to apart of polyvinyl alcohol as described in JP-A No. 7-9758,as well as block copolymers of vinyl compounds having a hydrophobic group and vinyl alcohols as described in JP-A No. 8-25795.

Polyvinyl alcohols, in which the degree of polymerization or modification differ, may be employed in combination of at least two types.

The added amount of an inorganic pigment employed in the ink absorbing layer varies largely depending on a void ratio of the porous layer, and the type of inorganic pigments and the type of water-soluble resins, however, is generally 5-30 g and preferably 10-25 g, per $m^2$ of the recording sheet.

Further, the ratio of an inorganic pigment to a water-soluble resin is generally 2/1 and specifically preferably 3/1-10/1, based on weight %.

The ink absorbing layer may contain a cationic water-soluble polymer having a quaternary ammonium salt group in the molecule, which is generally employed in the range of 0.1 10.0 g and is preferably 0.2-5.0 g, per $m^2$ of the recording sheet.

The total amount of the voids (meaning void volume) in the porous layer is preferably at least 20 ml per $m^2$ of the recording sheet. In the case that the void volume is less than 20 $ml/m^2$, ink absorption is adequate for low ink volume at printing, however, problems are often caused in that ink cannot be absorbed completely resulting in deterioration of image quality and retardation of drying for high ink volume.

In the porous layer having an ink retaining ability, the ratio of a void volume against a volume of a solid substance is called a void ratio. In this invention, it is preferable to make the void ratio of at most 50% to prepare voids efficiently without making the film thickness unnecessarily heavy.

As another porous type ink absorbing layer, other than forming an ink absorbing layer using an inorganic pigment, the ink absorbing layer may be formed utilizing a coating composition containing a polyurethane resin emulsion in combination with a water-soluble epoxy compound and/or an acetoacetylated polyvinyl alcohol, and further an epichlorohydrin polyamide resin. A polyurethane resin emulsion in this case is preferably one having a particle diameter of 3.0 μm, in which the particles are provided with a polycarbonate chain or a polycarbonate chain and polyester chain. It is more preferable that the polyurethane resin of a polyurethane resin emulsion has a sulfonate group in the molecule and also an epichlorohydrin polyamide resin and a water-soluble epoxy compound and/or acetoacetylated polyvinyl alcohol. Herein the polyurethane resin is obtained with reaction of polycarbonate polyol, polyol having polycarbonate polyol and polyester polyol and an aliphatic isocyanate compound.

It is presumed that weak coagulation of cations and anions is formed in the ink absorbing layer using the foregoing polyurethane resin, and based on this, the voids having ink absorbing capability are formed to produce images.

(Thermoplastic Resin)

In this invention, provided is a layer containing a thermoplastic resin on the surface layer of an ink absorbing layer.

A layer containing a thermoplastic resin may be a layer comprised of only a thermoplastic resin or a layer in which such as a water-soluble binder is appropriately incorporated thereto, however, preferably is a layer in which both a water-soluble binder and an inorganic pigment are incorporated. As an inorganic pigment which can be incorporated in the thermoplastic resin, utilized can be substances described above in the explanation of an ink absorbing layer.

The thermoplastic resin is preferably comprised of micro-particles with respect to ink permeability.

Thermoplastic resins or micro-particles thereof include, for example, polycarbonate, polyacrylonitrile, polystyrene, polyacrylic acid, polymethacrylic acid, acrylic ester co-polymer, polyvinyl chloride, polyvinylidene chloride, polyvinyl acetate, polyester, polyamide, polyether, and copolymers and salts thereof, and preferable among them are a styrene-acrylic acid ester copolymer, a methacrylic acid ester-acrylic acid ester copolymer, a vinyl chloride-vinyl acetate copolymer, an acrylic ester copolymer, a vinyl chloride-acrylic acid ester copolymer, ethylene-vinyl acetate copolymer, ethylene-acrylic acid ester copolymer and a SBR latex. Furthermore preferable thermoplastic resins are acrylic ester copolymers.

Thermoplastic resins or micro-particles thereof can be utilized in combinations of plural polymers of different monomer compositions, particle diameters and polymerization degrees.

When selecting thermoplastic resins or micro-particles thereof, considered have to be ink acceptability, glossiness of images after fixing by heat and pressure, image fastness and mold-releasing property.

As for ink acceptability, when the particle diameter of thermoplastic resinous micro-particles is less than 0.05 μm, separation of pigment particles and an ink solvent is delayed resulting in decrease of ink absorbing rate. While, when the diameter is more than 10 μm, it is not preferable also with respect to such as adhesion with a solvent absorbing layer adjacent to the ink absorbing layer when the layers are coated on a support, film strength of an ink-jet recording medium after having been coated and dried, as well as gloss exhibition. Therefore, the particle diameter of thermoplastic resinous micro-particles is preferably 0.05-10 μm, more preferably 0.1-5.0 μm and furthermore preferably 0.1-1.0 μm.

Further, the selection criterion of the thermoplastic resin or micro-particles thereof includes a glass transition temperature (Tg). When Tg is lower than temperatures of coating and drying, voids of thermoplastic resinous micro-particles for ink solvent permeation may be disappeared because the temperatures of coating and drying at the time of manufacturing of a recording medium are already higher than the Tg.

While, when the Tg is higher than temperatures to cause heat modification of a support, a fixing operation at higher temperatures are required for fusing and film formation after ink-jet recording by pigment ink resulting in problems of such as a burden of the apparatus and heat stability of the support. The Tg of thermoplastic resinous micro-particles is preferably 50-150° C. Further, the minimum film forming temperature is preferably 50-150° C.

Thermoplastic resinous micro-particles are preferably those dispersed in a water-based phase with respect to environmental adaptability, and specifically preferably is a water-based latex prepared by emulsion polymerization. In this case, preferably utilized can be a type prepared by emulsion polymerization employing a nonionic dispersant as an emulsifying agent.

Further, thermoplastic resinous micro-particles preferably contain a residual monomer component as little as possible, with respect to odor and safety, and it is preferably at most 3 weight %, more preferably at most 1 weight % and specifically preferably at most 0.1 weight %, based on a solid component of a polymer. Further, a residual polymerization initiator is preferably as little as possible, preferably is at most 0.5% based on a solid component of a polymer, and most preferably not remained.

As a water-soluble binder, such as polyvinyl alcohol and polyvinyl pyrrolidone can be utilized in a range of 1-10% of thermoplastic resinous micro-particles.

A recording medium is preferably provided with an ink absorbing layer on a support and the surface layer preferably contains at least an inorganic pigment and thermoplastic resinous micro-particles. Particularly, listed can be the following reasons for being preferable:

1) The rate of ink absorption is large, and deterioration of image quality such as beading and color bleed is hardly caused, as well as provided is high speed printing adoptability, 2) The strength of image surface is strong, 3) Being hardly fused when being accumulated during image storage, 4) Having excellent coating productivity of an ink absorbing layer, 5) Being provided with writing ability.

In this case, the solid weight ratio of thermoplastic resinous micro-particles to an inorganic pigment is preferably individually determined depending on such as the thermoplastic resinous micro-particles, the inorganic pigment and other additives, and not limited specifically, and (the thermoplastic resinous micro-particles)/(the inorganic pigment) is preferably 2/8-8/2,more preferably 3/7-7/3 and furthermore preferably 4/6-6/4.

[Ink]

In ink utilized in this invention, the colorant may be either of a dye or a pigment provided having adoptability to ink-jet recording. Pigment ink is preferable with respect to image storage stability and image quality.

(Dyes)

Dyes include such as a water-soluble direct dye, an acid dye, a reactive dye and a basic dye, and these may be utilized alone or in combination of plural types. These dyes are utilized by being dissolved in a solvent appropriately selected, when necessary. Typical dyes will be listed below:

<Direct Dyes>

C. I. Direct Yellow: 1, 4, 8, 11, 12, 24, 26, 27, 28, 33, 39, 44, 50, 58, 85, 86, 100, 110, 120, 132, 142, 144

C. I. Direct Red: 1, 2, 4, 9, 11, 13, 17, 20, 23, 24, 28, 31, 33, 37, 39, 44, 47, 48, 51, 62, 63, 75, 79, 80, 81, 83, 89, 90, 94, 95, 99, 220, 224, 227, 243

C. I. Direct Blue: 1, 2, 6, 8, 15, 22, 25, 71, 76, 78, 80, 86, 87, 90, 98, 106, 108, 120, 123, 163, 165, 192, 193, 194, 195, 196, 199, 200, 201, 202, 203, 207, 236, 237

C. I. Direct Black: 2, 3, 7, 17, 19, 22, 32, 38, 51, 56, 62, 71, 74, 75, 77, 105, 108, 112, 117, 154

<Acid Dyes>

C. I. Acid Yellow: 2, 3, 7, 17, 19, 23, 25, 29, 38, 42, 49, 59, 61, 72, 99

C. I. Acid Orange: 56, 64

C. I. Acid Red: 1, 8, 14, 18, 26, 32, 37, 42, 52, 57, 72, 74, 80, 87, 115, 119, 131, 133, 134, 143, 154, 186, 249, 254, 256

C. I. Acid Violet: 11, 34, 75

C. I. Acid Blue: 1, 7, 9, 29, 87, 126, 138, 171, 175, 183, 234, 236, 249

C. I. Acid Green: 9, 12, 19, 27, 41

C. I. Acid Black: 1, 2, 7, 24, 26, 48, 52, 58, 60, 94, 107, 109, 110, 119, 131, 155

<Reactive Dyes>

C. I. Reactive Yellow: 1, 2, 3, 13, 14, 15, 17, 37, 42, 76, 95, 168, 175

C. I. Reactive Red: 2, 6, 11, 21, 22, 23, 24, 33, 45, 111, 112, 114, 180, 218, 226, 228, 235

C. I. Reactive Blue: 7, 14, 15, 18, 19, 21, 25, 38, 49, 72, 77, 176, 203, 220, 230, 235

C. I. Reactive Orange: 5, 12, 13, 35, 95

C. I. Reactive Brown: 7, 11, 33, 37, 46

C. I. Reactive Green: 8, 19

C. I. Reactive Violet: 2, 4, 6, 8, 21, 22, 25

C. I. Reactive Black: 5, 8, 31, 39

<Basic Dyes>

C. I. Basic Yellow: 11, 14, 21, 32

C. I. Basic Red: 1, 2, 9, 12, 13

C. I. Basic Violet: 3, 7, 14

C. I. Basic Blue: 3, 9, 24, 25

Dyes include, other than these, chelate dyes and azo dyes which are utilized in a so-called silver dye bleach photographic material (such as Cibachrome, manufactured by Ciba-Geigy Co.). With respect to chelate dyes, referred to can be, for example, the description of British Patent No. 1,077, 484. With respect to azo dyes for a silver dye bleach photographic material, referred to can be, for example, the description of British Patent Nos. 1,039,458, 1,004,957 and 1,077, 628,and U.S. Pat. No. 2,612,448. The content of a water-soluble dye is preferably 1-10 weight % per total weight of ink.

(Pigments)

In this invention pigments are preferably utilized as another colorant with respect to image storage stability. As pigments, preferably utilized are organic pigments such as insoluble pigments and lake pigments, and carbon black.

Insoluble pigments are not specifically limited and preferable are, for example, such as azo, azomethine, methine, diphenyl methane, triphenyl methane, quinacridone, anthraquinone, perylene, indigo, quinophthalone, isoindolinone, isoindoline, azine, oxazine, thiazine, dioxazine, thiazole, phthalocyanine and diketopyropyrrole.

Specific pigments preferably utilized include the following pigments:

Pigments for magenta or red include, for example, such as C. I. Pigment Red,2,C. I. Pigment Red 3,C. I. Pigment Red 5,C. I. Pigment Red 6,C. I. Pigment Red 7,C. I. Pigment Red 15,C. I. Pigment Red 16,C. I. Pigment Red 48:1, C. I. Pigment Red 53:1,C. I. Pigment Red 57:1,C. I. Pigment Red 122,C. I. Pigment Red 123,C. I. Pigment Red 139,C. I. Pigment Red 144,C. I. Pigment Red 149,C. I. Pigment Red 166,C. I. Pigment Red 177,C. I. Pigment Red 178 and C. I. Pigment Red 222.

Pigments for orange or yellow include, for example, such as C. I. Pigment Orange 31,C. I. Pigment Orange 43,C. I. Pigment Yellow 12,C. I. Pigment Yellow 13,C. I. Pigment Yellow 14,C. I. Pigment Yellow 15,C. I. Pigment Yellow 17, C. I. Pigment Yellow 93,C. I. Pigment Yellow 94 and C. I. Pigment Yellow 138.

Pigments for green or cyan include, for example, such as C.I. Pigment Blue 15,C.I. Pigment Blue 15:2,C.I. Pigment Blue 15:3,C.I. Pigment Blue 16,C. I. Pigment Blue 60 and C. I. Pigment Green 7.

For these pigments, a dispersant may be incorporated when necessary, and utilizable pigment dispersants include, for example, surfactants such as a higher fatty acid salt, alkyl sulfate, alkyl ester sulfate, alkyl sulfonate, sulfosuccinate, naphthalene sulfonate, alkyl phosphate, polyoxyalkylene alkylether phosphate, polyoxyalkylene alkylphenylether, polyoxyethylene polyoxypropylene glycol, glycerin ester, sorbitan ester, polyoxyethylene fatty acid amide and amine oxide; or block copolymers, random copolymers and salts thereof comprised of not less than two monomers selected from styrene, styrene derivatives, vinylnaphthalene derivatives, acrylic acid, acrylic acid derivatives, maleic acid, maleic acid derivatives, itaconic acid, itaconic acid derivatives, fumaric acid and fumaric acid derivatives.

As a dispersion method of a pigment, utilized can be, for example, various kinds of dispersion apparatuses such as a ball mill, a sand mill, an attritor, a roll mill, an agitator, a Henschel mixer, a colloidal mixer, an ultrasonic homogenizer, a pearl mill, a wet-type jet mill, and a paint shaker.

Further, a centrifugal separator or a filter is also preferably utilized, for the purpose of eliminating coarse particles of a pigment dispersion according to this invention.

An average particle diameter of pigment particles in pigment ink is selected in consideration of such as stability in ink, image density, glossy appearance and light fastness, and in addition, in an image forming method of the invention, the particle diameter is suitably selected also with respect to gloss improvement and sensation in quality improvement. The reason of improvement of gloss or sensation in quality in this invention is not clear at present, however, it is estimated to relate to a state of pigment in a formed image being dispersed in a film comprised of melted thermoplastic resinous micro-particles. In case of aiming a high speed treatment, it is necessary to fuse thermoplastic resinous micro-particles to be made into a film as well as to sufficiently disperse a pigment in a film within a short time. At this time, a surface area of a pigment may significantly influence this process, so that the most suitable region of average particle diameter is considered to exist.

(Water-soluble Organic Solvents)

A water-based ink composition as a preferable form of pigment ink preferably incorporates a water-soluble organic solvent.

Water-soluble organic solvents include, for example, such as alcohol series (for example, such as methanol, ethanol, propanol, isopropanol, butanol, iso-butanol, secondary butanol, tertiary butanol, pentanol, hexanol, cyclohexanol and benzyl alcohol), polyhydric alcohol series (for example, such as ethylene glycol, diethylene glycol, triethylene glycol, polyethylene glycol, propylene glycol, dipropylene glycol, polypropyrene glycol, butylene glycol, hexane diol, pentane diol, glycerin, hexane triol and thiodiglycol), polyhydric alcohol ether series (for example, such as ehtyleneglycol monomethylether, ethyleneglycol monoethylether, ethyleneglycol monobutylether, diethyleneglycol monometylether, diethyleneglycol monoetylether, diethyleneglycol monobutylether, propyleneglycol monometylether, propyleneglycol monobutylther, ehtyleneglycol monomethylether actate, triehtyleneglycol monomethylether, triehtyleneglycol monoethylether, triehtyleneglycol monobutylether, ehtyleneglycol monophenylether and propyleneglycol monophenylether), amine series (for example, such as ethanol amine, diethanol amine, triethanol amine, N-methyl diethanol amine, N-ethyl diethanol amine, morpholine, N-ethyl morpholine, ethylene diamine, diethylene diamine, triethylene tetramine, tetraethylene pentamine, polyethylene imine, pentamethyl diethylene triamine and tetramethyl propylene diamine), amide series (for example, such as formamide, N,N-dimethyl formamide and N,N-dimethyl acetoamide), heterocyclic series (for example, such as 2-pyrrolidone, N-mehtyl-2-pyrrolidone, cyclohexyl pyrrolidone, 2-oxazolidone and 1,3-dimethyl-2-imidazolidinone), sulfoxide series (for example, such as dimethyl sulfoxide), sulfon series (for example, such as sulforane), urea, acetonitrile and acetone. Preferable water-soluble organic solvents include polyhydric alcohol series. Further, a combination of polyhydric alcohol and polyhydric alcohol ether is specifically preferably utilized.

A water-soluble organic solvent may be utilized alone or in combination of plural types. The added amount of a water-soluble organic solvent in ink is 5-60 weight % and preferably 10-35 weight %, as a total amount.

Further, in the ink composition, corresponding to purposes for enhancement of various capabilities such as ejection stability, adaptability to the print head or ink cartridge, storage stability, image retaining properties and other performance, appropriately employed may be various types of additives such as viscosity modifiers, surface tension controlling agents, specific resistance controlling agents, film forming agents, dispersants, surfactants, UV absorbers, antioxidants, anti-fading agents, antifungal agents and rust inhibitors.

Particularly, preferable is addition of thermoplastic resinous micro-particles with respect to achieve the effects of this invention. As thermoplastic resinous micro-particles utilized can be the types described in the explanation of thermoplastic resins or micro-particles thereof which can be added in the surface layer of the above-described recording medium. Particularly, it is preferable to utilize those not causing such as viscosity increase and precipitation when being added in the ink. An average particle diameter of thermoplastic resinous micro-particles is preferably at most 0.5 μm and is selected more preferably in a range of 0.2-2.0 times of the average particle diameter of pigments in the ink with respect to stability. The thermoplastic resinous micro-particles are preferably melt and softened in a range of 50-200° C.

The ink composition preferably has a viscosity at the time of flying of at most 40 mPa·s and more preferably at most 30 mPa·s.

The ink composition preferably has a surface tension at the time of flying of at least 20 mN/m and more preferably 30-45 mN/m.

A pigment solid concentration in the ink can be selected in a range of 0.1-10.0 weight %, and to obtain photographic images, so-called deep and light inks, in which each pigment solid concentration is varied, are preferably utilized; specifically preferably utilized is each of yellow, magenta, cyan and black deep and light inks. Further, specialty color inks such as red, green and blue can be appropriately utilized, with respect to excellent color reproduction.

[Image Formation]

In an image forming method of this invention, utilized without restriction can be such printers commercially available on the market provided with a recording medium storing section, a transfer section, an ink cartridge and an ink-jet print head, however, in the case that ink-jet photography is utilized for commercial application, useful is a series of printer sets constituted of at least a roll-shape recording medium storing section, a transfer section, an ink-jet print head and a cutting section, as well as a heating section, a pressing section and a recorded print storing section, when necessary.

A recording head may be any of a piezo method, a thermal method and a continuous method, however, a piezo method is preferred with respect to stability of pigment ink.

(Colorless or White Liquid Supply)

An image forming method of this invention is characterized in supplying a colorless or white liquid on a recording medium before a fixing process described below, followed by fusing or film forming of thermoplastic resinous micro-particles resulting in image fixing. By addition of this process, formed are images having improved glossiness of the white background without deterioration of image quality.

A colorless or white liquid in this invention means a colorless and transparent, or achromatic and milky-white liquid containing no colored substances. Specifically, it includes water, water-soluble organic solvents utilized in the aforementioned water-based ink, a water-based latex of the aforementioned thermoplastic resins, organic solvents utilized in oil-based ink, water-based or oil-based ink from which colorants having been eliminated. Among them, preferable are water-soluble organic solvents utilized in water-based ink, a water-based latex of a thermoplastic resin and water-based ink from which colorants having been eliminated, and also preferable are those containing both of a thermoplastic resin and a water-soluble organic solvent. Specifically preferable is water-based ink from which colorants having been eliminated. Organic solvents utilized in oil-based ink have limited application with respect to environmental aspects.

As thermoplastic resins, utilized can be the types described in the explanation of thermoplastic resins or micro-particles thereof which can be added in the surface layer of the aforementioned recording medium.

Further, the charge of thermoplastic resins is preferably nonionic or anionic with respect to both of image quality and gloss exhibition, and is more preferably nonionic.

Supply Amount: The supply amount of the colorless or white liquid is not specifically limited provided being less than the absorbing capacity of the recording medium, and is preferably in a range of 1-30 ml/$m^2$, more preferably 2-26 ml/$m^2$ and furthermore preferably 2-12 ml/$m^2$.

Further, the maximum amount of the total of recording ink and a colorless or white liquid is preferably less than 30 ml/$m^2$ and more preferably less than 26 ml/$m^2$. While, the minimum amount of the total of recording ink and a colorless or white liquid is preferably at least 2 ml/$m^2$.

In this invention, supposed is a case of mixing of a colorless or white liquid and recording ink. One case is that they may be mixed on a recording medium. Further, in the case of supplying a colorless or white liquid and recording ink from an ink-jet nozzle, they may be contaminated with each other ink, which is not preferable. In addition, it is the case that the same head is utilized for recording ink or a colorless or white liquid at each printing mode. Even in these cases, image quality deterioration or gloss decrease can not be allowed. Studies have been made with this respect, which resulted in founding that there caused no image quality deterioration nor gloss decrease even when recording ink and a colorless or white liquid are mixed, provided that the absorbance change is at most 5% against the absorbance immediately after mixing. More specifically, 10 ml of a colorless or white liquid were added into 40 ml of recording ink and, after having been mixed, the absorbance of the supernatant liquid is measured. Next, the aforementioned mixed solution was sealed to be stored under environment of 25° C. for 3 days, followed by measurement of the absorbance of the supernatant liquid in a similar manner to be compared with the absorbance measured above.

The portion of a recording medium, on which a colorless or white liquid is supplied, is preferably a white background, namely, a portion without printed images or with printed images having an image density of at least 0.5. Herein, an image density of at most 0.5 means that any of B, G, R and a visual density is at most 0.5.

To supply a colorless or white liquid on a recording medium, there is a method employing an ink-jet nozzle which is employed in bar coating, a spray or ink-jet printer, however an ink-jet nozzle is preferably employed with respect to such as controllability and cost. In an image forming method employing an ink-jet printer, it is also possible to supply a colorless or white liquid on the white background of a recording medium before ink ejection because an image density after ink ejection can be known prior to ink ejection. Further, it is also possible to supply a colorless or white liquid on the white background of a recording medium after ink ejection.

Preferable embodiments to supply a colorless or white liquid employing an ink-jet nozzle include simultaneous supply together with recording ink. For example, a head for five colors is prepared to be separately utilized for each of yellow, magenta, cyan, black, and a colorless or white liquid, or a head for eight colors is prepared to be separately utilized for each of yellow, deep magenta ink, light magenta ink, deep cyan ink, light cyan ink, deep black ink, light black ink, and a colorless or white liquid. Further, a head for nine colors is prepared to be separately utilized for each deep and light inks of yellow, magenta cyan and black, and a colorless or white liquid.

Further, one of the nozzles for light inks of a eight-color ink head can be diverted for a colorless or white liquid depending on the purpose.

In the case of supplying a colorless or white liquid employing an ink-jet nozzle, the volume of an ink droplet may be same as that of recording ink or may be set at an independent volume. Specifically, it can be selected in a range of 2-100 pl. Particularly, in the case of supplying a colorless or white liquid on the white background, it is preferably larger than the volume of an ink droplet of recording ink with respect to shortening the printing time.

(Fixing Process)

In this invention, fixing is performed after printing to heat and press the thermoplastic resin of a recording medium to be fused or made into a film. The process may be performed plural times.

The fixing process may be provided continuously after each printing or in the lump after printing a certain amount. Fixing is preferably performed in a range of certain time duration after printing and/or supplying of a colorless or white liquid with respect to gloss exhibition. It is preferable to fix by a fixing process in from 5 seconds to 10 minutes after printing and/or supplying of a colorless or white liquid and more preferably from 10 seconds to 5 minutes. It is preferable to fix by a fixing process in from 5 seconds to 10 minutes after printing and/or supplying of a colorless or white liquid and more preferably from 10 seconds to 5 minutes, also with respect to gloss improvement in the portion of a white background or of lower densities.

In the aforesaid method, images in which an inorganic pigment and a thermoplastic resin coexist being mixed or in the neighborhood are preferably subjected to fixing process, by heat and pressure, and in this case, the thermoplastic resin is specifically preferably fused partially or completely and is further made into a film.

In a thermal fixing process, provided is energy as much as to sufficiently exhibit the effects of this invention, however, it is not preferable to provide excessive energy more than required because such as deformation of a support may be caused resulting in even deterioration of glossy appearance. Heating temperature is a temperature to capable of smoothening images, and is preferably in a range of 60-200° C. and more preferably 80-160° C.

Heating may be performed either by a heating device provided in a printer or one separately provided. As a heating means, it is preferable to employ a heating roller since it is suitable to minimize roughness, save space and perform continues processing. Further, a thermal fixing device of electrophotography can be applied as these apparatuses, and is advantageous in cost aspect.

For example, a heating and pressing process is performed by passing a recording medium between a heat roller, inside of which an exothermic member is provided, and a press roller, or heating may be performed by sandwiching a recording medium between two heating rollers. A heating roller is comprised of a hollow roller and rotated by a driving means. An exothermic member comprised of such as a halogen lamp heater, ceramic heater, Ni-chrome wire provided inside of the roller. The roller is preferably made of materials having a high thermal conductivity and a metal roller is specifically preferred. The surface of the roller is preferably coated by a fluorine resin to prevent contamination. In addition, a silicone rubber roller covered with heat resistant silicon can be utilized.

The transfer speed of a recording medium in the case of employing a heat roller is preferably in a range of 1-15 mm/sec. This is also preferred with respect to image quality as well as high speed processing.

Pressing simultaneous with heating or immediately after heating is preferable to obtain higher sensation in quality and gloss. A pressure to press is preferably in a range of $9.8\times10^4$-$4.9\times10^6$ Pa. This is because film formation is accelerated by pressing.

EXAMPLES

This invention will be explained more specifically in the following in reference to examples, however, this invention is not limited thereto.

Example 1

<Preparation of Ink>

Pigment ink 1 and dye ink 1 were prepared according to the following method.

<Preparation of Pigment Dispersion Composition>

<Preparation of Yellow Pigment Dispersion 1>

| | |
|---|---|
| C.I. Pigment Yellow 74 | 20 weight % |
| Styrene-acrylic acid copolymer (a molecular weight of 10,000, an acid value of 120) | 12 weight % |
| Diethylene glycol | 15 weight % |
| Ion-exchanged water | 53 weight % |

After the above each composition was mixed, the system was dispersed employing a horizontal-type beads mill (System Zeta Mini, produced by Ashizawa Co., Ltd.) filled with zirconia beads of 0.3 mm diameter at a volume ratio of 60%, to prepare yellow pigment dispersion 1. An average particle diameter of yellow pigment obtained was 112 nm.

<Preparation of Magenta Pigment Dispersion 1>

| | |
|---|---|
| C.I. Pigment Red 122 | 25 weight % |
| Joncryl 61 (acryl-styrene type resin, manufactured by Johnson Co.) | 18 weight % solid |
| Diethylene glycol | 15 weight % |
| Ion-exchanged water | 42 weight % |

After the above each composition was mixed, the system was dispersed employing a horizontal-type beads mill (System Zeta Mini, produced by Ashizawa Co., Ltd.) filled with zirconia beads of 0.3 mm diameter at a volume ratio of 60%, to prepare magenta pigment dispersion 1. An average particle diameter of magenta pigment obtained was 105 nm.

<Preparation of Cyan Pigment Dispersion 1>

| | |
|---|---|
| C.I. Pigment Blue 15:3 | 25 weight % |
| Joncryl 61 (acryl-styrene type resin, manufactured by Johnson Co.) | 15 weight % solid |
| Glycerin | 10 weight % |
| Ion-exchanged water | 50 weight % |

After the above each composition was mixed, the system was dispersed employing a horizontal-type beads mill (System Zeta Mini, produced by Ashizawa Co., Ltd.) filled with zirconia beads of 0.3 mm diameter at a volume ratio of 60%, to prepare cyan pigment dispersion 1. An average particle diameter of cyan pigment obtained was 87 nm.

<Preparation of Black Pigment Dispersion 1>

| | |
|---|---|
| Carbon black | 20 weight % |
| Styrene-acrylic acid copolymer (a molecular weight of 7,000, an acid value of 150) | 10 weight % |
| Glycerin | 10 weight % |
| Ion-exchanged water | 60 weight % |

After the above each composition was mixed, the system was dispersed employing a horizontal-type beads mill (System Zeta Mini, produced by Ashizawa Co., Ltd.) filled with zirconia beads of 0.3 mm diameter at a volume ratio of 60%, to prepare black dispersion 1. An average particle diameter of black pigment obtained was 75 nm.

<Preparation of Yellow Deep Ink 1>

| | |
|---|---|
| Yellow pigment dispersion 1 | 15 weight % |
| Ethylene glycol | 20 weight % |
| Diethylene glycol | 10 weight % |
| Surfactant (Surfinol 465, manufactured by Nisshin Chemical Ind. Co., Ltd.) | 0.1 weight % |
| Ion-exchanged water | 54.9 weight % |

After mixing and stirring the above each composition, the system was filtered through a 1 μm filter to prepare yellow deep ink 1. An average particle diameter of the pigment included in the ink was 120 nm and a surface tension of the ink was 36 mN/m.

<Preparation of Yellow Light Ink 1>

| | |
|---|---|
| Yellow pigment dispersion 1 | 3 weight % |
| Ethylene glycol | 25 weight % |
| Diethylene glycol | 10 weight % |
| Surfactant (Surfinol 465, manufactured by Nisshin Chemical Ind. Co., Ltd.) | 0.1 weight % |
| Ion-exchanged water | 61.9 weight % |

After mixing and stirring the above each composition, the system was filtered through a 1 μm filter to prepare yellow light ink 1. An average particle diameter of the pigment included in the ink was 118 nm and a surface tension of the ink was 37 mN/m.

<Preparation of Magenta Deep Ink 1>

| | |
|---|---|
| Magenta pigment dispersion 1 | 15 weight % |
| Ethylene glycol | 20 weight % |
| Diethylene glycol | 10 weight % |
| Surfactant (Surfinol 465, manufactured by Nisshin Chemical Ind. Co., Ltd.) | 0.1 weight % |
| Ion-exchanged water | 54.9 weight % |

After mixing and stirring the above each composition, the system was filtered through a 1 μm filter to prepare magenta deep ink 1. A average particle diameter of the pigment included in the ink was 113 nm and a surface tension of the ink was 35 mN/m.

<Preparation of Magenta Light Ink 1>

| | |
|---|---|
| Magenta pigment dispersion 1 | 3 weight % |
| Ethylene glycol | 25 weight % |
| Diethylene glycol | 10 weight % |
| Surfactant (Surfinol 465, manufactured by Nisshin Chemical Ind. Co., Ltd.) | 0.1 weight % |
| Ion-exchanged water | 61.9 weight % |

After mixing and stirring the above each composition, the system was filtered through a 1 μm filter to prepare magenta light ink 1. An average particle diameter of the pigment included in the ink was 110 nm and a surface tension of the ink was 37 mN/m.

<Preparation of Cyan Deep Ink 1>

| | |
|---|---|
| Cyan pigment dispersion 1 | 10 weight % |
| Ethylene glycol | 20 weight % |
| Diethylene glycol | 10 weight % |
| Surfactant (Surfinol 465, manufactured by Nisshin Chemical Ind. Co., Ltd.) | 0.1 weight % |
| Ion-exchanged water | 59.9 weight % |

After mixing and stirring the above each composition, the system was filtered through a 1 μm filter to prepare cyan deep ink 1. An average particle diameter of the pigment included in the ink was 95 nm and a surface tension of the ink was 36 mN/m.

<Preparation of Cyan Light Ink 1>

| | |
|---|---|
| Cyan pigment dispersion 1 | 2 weight % |
| Ethylene glycol | 25 weight % |
| Diethylene glycol | 10 weight % |
| Surfactant (Surfinol 465, manufactured by Nisshin Chemical Ind. Co., Ltd.) | 0.2 weight % |
| Ion-exchanged water | 62.8 weight % |

After mixing and stirring the above each composition, the system was filtered through a 1 μm filter to prepare cyan light ink 1. An average particle diameter of the pigment included in the ink was 92 nm and a surface tension of the ink was 33 mN/m.

<Preparation of Black Deep Ink 1>

| | |
|---|---|
| Black pigment dispersion 1 | 10 weight % |
| Ethylene glycol | 20 weight % |
| Diethylene glycol | 10 weight % |
| Surfactant (Surfinol 465, manufactured by Nisshin Chemical Ind. Co., Ltd.) | 0.1 weight % |
| Ion-exchanged water | 59.9 weight % |

After mixing and stirring the above each composition, the system was filtered through a 1 μm filter to prepare black deep ink 1. An average particle diameter of the pigment included in the ink was 85 nm and a surface tension of the ink was 35 mN/m.

<Preparation of Black Light Ink 1>

| | |
|---|---|
| Black pigment dispersion 1 | 2 weight % |
| Ethylene glycol | 25 weight % |
| Diethylene glycol | 10 weight % |
| Surfactant (Surfinol 465, manufactured by Nisshin Chemical Ind. Co., Ltd.) | 0.1 weight % |
| Ion-exchanged water | 62.9 weight % |

After mixing and stirring the above each composition, the system was filtered through a 1 μm filter to prepare black light ink 1. An average particle diameter of the pigment included in the ink was 89 nm and a surface tension of the ink was 36 mN/m.

The above ink set of 8 kinds is named as pigment ink 1.

Successively, dye ink 1 is prepared according to the following method.

(Preparation of Black Ink K-1)

After sufficiently stirring the components described below, the system was filtered through a 0.8 μm filter (DISMIC-25CS, manufactured by Toyo Roshi Kaisha Ltd.) to prepare black ink K-1.

| | |
|---|---|
| Hydrolyzed product of Kayacion Black P-NBR liq.40 (manufactured by Nippon Kayaku Co., Ltd., an aqueous solution of 40 weight % solid) | 25 weight % |
| Proxel GXL (D) (manufactured by Zeneka Co., Ltd., an aqueous solution of 20 weight %) | 0.2 weight % |
| Ethylene glycol | 12 weight % |
| Diethylene glycol | 13 weight % |

Ion-exchanged water was added to make the total amount of 100 g.

(Preparation of Yellow Ink Y-1, Magenta Ink M-1 and Cyan Ink C-1)

Each of yellow ink Y-1, magenta ink M-1 and cyan ink C-1 was prepared in a similar manner to the preparation of black ink K-1 described above, except that 5 weight % of acid dye C. I. Acid Yellow 42, 3 weight % of acid dye C. I. Acid Red 106 and 3.8 weight % of acid dye C. I. Acid Blue 249 were utilized respectively instead of the dye for black ink K-1 (hydrolyzed product of Kayacion Black P-NBR liq. 40).

<Preparation of Dye Ink 1>

An ink set comprised of the combination of black ink K-1, yellow ink Y-1, magenta ink M-1 and cyan ink C-1 is named as dye ink 1.

Hydrolysis of reactive dye Kayacion Black P-NBR liq. 40 was performed as follows based on a hydrolysis method well known in the art (described in "preparation example" at p 6 of JP-A No. 59-199781).

Distilled water of 400 parts was added to reactive dye Kayacion Black P-NBR liq. 40 (an aqueous solution of 40 weight % solid, manufactured by Nippon Kayaku Co., Ltd.) and stirred at 30° C. until being uniformly dissolved. Next, sodium hydroxide of 1 part was dissolved in distilled water of 100 parts, which was added to the dye solution prepared above and stirred for reaction at 30° C. for 2.5 hours to finish the hydrolysis (the completion of the hydrolysis was confirmed by means of thin layer chromatography).

Next, a saturated solution of sodium acetate was added to the reacted solution to perform salting out, and the system having been filtered followed by washing with ethanol to obtain the hydrolyzed product of aimed reactive dye Kayacion Black P-NBR liq. 40.

<Preparation of Recording Medium>

Recording media 1-3 were prepared according to the following manner.

<Preparation of Recording medium 1>

A thermoplastic resin (styrene-acrylic-type latex, Tg of 73° C., an average particle diameter of 0.4 μm, 40 weight % solid) was coated on ink-jet paper Photolike QP, manufactured by Konica Corp. to make 2.5 $g/m^2$ by use of a wired-bar and dried, followed by over coating of boric acid so as to make 1 $g/m^2$ to prepare recording medium 1.

<Preparation of Recording Medium 2>

(Preparation of Silica Dispersion)

After silica by gas-phase method (QS-20, manufactured by Tokuyama Co., Ltd.), having an average particle diameter of approximately 0.012 μm, of 125 kg was suction dispersed at room temperature into 620 L of pure water, the pH of which having been adjusted to 2.5 by sulfuric acid, by use of Jet-stream Inductor Mixer TDS, produced by Mitamura Riken Kogyo Co., Ltd., and the total volume was made up to 694 L to prepare silica dispersion solution-1.

Next, above-described silica dispersion solution-1 of 69.4 liters was added with stirring to a solution (pH=2.3) of 18 liters containing 1.41 kg of cationic polymer (P-1) described below, 2.2 liters of ethanol and 1.5 liters of n-propanol, subsequently, an aqueous solution of 7.0 liters (pH=7.3) containing 260 g of boric acid and 230 g of borax were added followed by addition of 1 g of a defoaming agent SN 381 (manufactured by Sannopco Co., Ltd.). The mixed solution was dispersed employing a high pressure homogenizer, produced by Sanwa Industry Co., Ltd., and the total volume was made up to 97 liters to prepare a silica dispersion solution. Herein, above-described gas phase prepared silica (QS-20) is one of inorganic pigments utilized in this invention.

CHEMICAL STRUCTURE 1

P-1

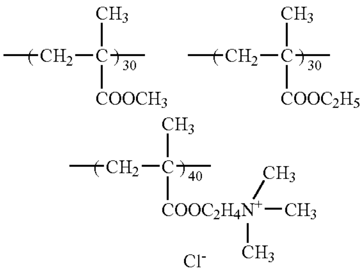

Mn = 13,000

<Preparation of Coating Solution 1>

Coating solution 1 was prepared by mixing the following compositions successively into 600 ml of the above-described silica dispersion solution with stirring at 40° C.

| | |
|---|---|
| 10% aqueous solution of polyvinyl alcohol (manufactured by Kuraray Co., Ltd.: PVA 203) | 6 ml |
| 7% aqueous solution of polyvinyl alcohol (manufactured by Kuraray Co., Ltd.: PVA 235) | 185 ml |

The total volume was made up to 1000 ml with pure water.

<Preparation of Coating Solution 2>

Coating solution 1 was mixed at 40° C., a thermoplastic resin (styrene-acrylic type latex, Tg of 73° C., an average particle diameter of 0.3 μm, 40 weight % solid) was added thereto so as to make 5/5 of a solid content ratio of silica/thermoplastic resin, and further appropriately added was water so as to make a viscosity at 40° C. of 45 mPa·s to prepared coating solution 2.

(Preparation of Recording Medium 2)

On a paper support (having a thickness of 220 μm, containing 13 weight % of anatase-type titanium oxide, based on polyethylene, in polyethylene of an ink absorbing layer surface) the both surfaces of which having been covered with polyethylene, above-described coating solution 2 as the first layer, the second layer, the third layer and the forth layer in this order from the support side was coated by simultaneous coating with a slide hopper and dried to prepare recording medium 2. Herein, the coating solution was coated by being heated at 40° C., cooled for 20 seconds in a cooling zone kept at 0° C. immediately after coating, dried with air of 25° C. (a relative humidity of 15%) for 60 seconds, with air of 45.° C. (a relative humidity of 25%) for 60 seconds and with air of 50° C. (a relative humidity of 25%) for 60 seconds, and, successively, after being re-humidified under an atmosphere of 20-25° C. and a relative humidity of 40-60% for 2 minutes, the sample was wound up. This recording medium was processed into a roll form of 127 mm wide and 100 m long. Recording medium 2 was sealing wrapped in a polyethylene bag after having been dried and kept in a conditioning oven at 55° C. for 3 days.

(Preparation of Recording Medium 3)

On a paper support (having a thickness of 220 μm, containing 13 weight % of anatase-type titanium oxide, based on polyethylene, in polyethylene of an ink absorbing layer surface) the both surfaces of which having been covered with polyethylene, above-described coating solution 1 as the first layer, the second layer, the third layer in this order from the support side, and above-described coating solution 2 as the forth layer were coated by simultaneous coating with a slide hopper and dried to prepare recording medium 3. Herein, the coating solution was coated by being heated at 40° C., cooled for 20 seconds in a cooling zone kept at 0° C. immediately after coating, dried with air of 25° C. (a relative humidity of 15%) for 60 seconds, with air of 45° C. (a relative humidity of 25%) for 60 seconds and with air of 50° C. (a relative humidity of 25%) for 60 seconds successively, after being re-humidified under an atmosphere of 20-25° C. and a relative humidity of 40-60% for 2 minutes, and the sample was wound up. This recording medium was processed into a roll form of 127 mm wide and 100 m long. Recording medium 3 was sealing wrapped in a polyethylene bag after having been dried and kept in a conditioning oven at 55° C. for 3 days.

The constitutions of thus prepared recording media 1-3 are shown in Table 1.

<Evaluations>

<Ink Absorbing Capacity>

A sample having a certain area was immersed in pure water for 10 seconds after having been kept under the condition of a relative humidity of 50% for 24 hours. Mean while, foams were eliminated by slowly moving the sample by being held with a pair of tweezers, because air in the voids of a recording medium adhering as foams on the surface may prevent water absorption. The sample pulled up after 10 seconds, and moisture of the surface of which was wiped off with filter paper to determine an absorption capacity from the weighing prior to and after the immersion. The results are shown in Table 1.

Generally, the ink absorbing capacity is preferably at least 22 ml/m$^2$ and more preferably 28-32 ml/M$^2$. As is clear from Table 1,the ink absorbing capacities of recording media 1-3, which are utilized in this invention, are in a preferable range.

<Preparation of Images>

<Preparation of Image 1>

The eight color inks of pigment ink 1 were set on a head for 8 colors of an ink-jet printer equipped with a thermal fixing device, above-described recording medium 3 of a 12.7 cm wide roll-form being supplied as a sheet, and printed were wedge images of yellow, magenta, cyan and black, and a grid pattern test chart in which each band of Y, M, C, B, G, R, Bk was drawn at a width of 1 cm in vertical and horizontal directions and a portrait image of a person to prepare image 1. Thermal fixing was not performed.

<Preparation of Image 2>

After the preparation of above-described image 1,pure water of 3 ml/m$^2$ is supplied by means of bar coating on the whole surface of a recording medium, and successively after 4 minute therefrom, performed was thermal fixing with a heat roller, the surface temperature of which was kept at 114° C., employing a thermal fixing device in the apparatus resulting in fusing and film forming of the thermoplastic resin on the surface layer to prepare image 2.

<Preparation of Images 3-20>

Images 3-20 were obtained in a similar manner to the preparation of above described image 2,except that the type of an image recording medium, the type of a colorless or white liquid, the supplying method, the supply timing and the supplied portion were varied as shown in Table 2. With respect to images 3-20,further explanation will be given below.

(Formation of Image 3)

After an image was formed in a similar manner to above-described image 1, 3.5 ml/m$^2$ liquid 1 was supplied on the whole surface thereof by use of a pressure-type spray, and thermal fixing was performed 2 minutes later employing a thermal fixing device in the apparatus. The surface temperature of a heat roller was 114° C.

(Formation of Image 4)

After an image was formed in a similar manner to above-described image 1, 2.5 ml/m$^2$ liquid 1 was supplied on the portion thereof having a image density at least 0.5 employing separate printer, an ink-jet head of which was filled with a colorless or white liquid, and thermal fixing was performed 1 minute later in a similar manner to image 3.

TABLE 1

| | | Upper layer | | | | | | |
|---|---|---|---|---|---|---|---|---|
| | | | Thermoplastic resin (B) | | | | | |
| Recording medium | Under layer Inorganic pigment | Inorganic pigment (A) | Particle diameter (μm) | Amount (g/m$^2$) | Amount ratio A/B | Absoption capacity (ml/m$^2$) | Over-coat: Boric acid (g/m$^2$) | Aging |
| 1 | No under layer | None | 0.4 | 2.5 | — | 28 | 1 | — |
| 2 | None | QS-20 | 0.3 | 2.5 | 5/5 | 28 | — | DT3 |
| 3 | QS-20 | QS-20 | 0.3 | 2.5 | 5/5 | 29 | — | DT3 |

DT3: being sealed, kept at 55° C., for 3 days (Formation of Images 5-11, 16, 17, 20)

Images 5-11, 16, 17, 20 were formed in a similar manner to formation of image 4,except that each of a recording medium, ink, the type of a colorless or white liquid, the supplied portion, the supplying amount and the time duration before fixing was varied.

(Formation of Image 12)

The 8-color inks of pigment ink 1 and liquid 1 were set on a head for 9 colors of an ink-jet printer equipped with a thermal fixing device (the liquid volume of the droplet ejected from this head is controlled at 40 pl), and a portrait image of 12.7 cm wide was printed. At this time, a liquid 1 was supplied from the ink-jet head at 4 ml/$m^2$ on the white background according to the image information. After 30 seconds, fixing was performed employing a fixing device in the apparatus. The surface temperature of the heat roller was 114° C.

(Formation of Images 13 and 14)

Images 13 and 14 were formed in a similar manner to image 12,except that each of the type of a colorless or white liquid, the supplied portion and the supply amount was varied as shown in the Table 2.

(Formation of Image 15)

Image 15 was formed in a similar manner to image 15, except that the supply amount of a colorless or white liquid was changed.

(Formation of Image 18)

The 8-color inks of pigment ink 1 and liquid 4 were set on a head for 9 colors of an ink-jet printer equipped with a thermal fixing device (the liquid volume of the droplet ejected from this head is controlled at 6 pl), and a portrait image of 12.7 cm wide was printed. At this time, a liquid 4 was supplied from the ink-jet head at 4 ml/$m^2$ on the white background depending on the image information. In 30 seconds after the recording, fixing was performed employing a fixing device in the apparatus. The surface temperature of the heat roller was 114° C.

(Formation of Image 19)

Image 19 was formed in a similar manner to formation of image 18,except that liquid 4 supplied was replaced by liquid 5.

(Composition of Colorless or White Liquid 1)

| | |
|---|---|
| Diethylene glycol | 15 weight % |
| Surfactant: Surfinol 465 (manufactured by Nisshin Chemicals Co., Ltd.) | 0.5 weight % |
| Water is added to make the total of 100 weight % | |

(Composition of Colorless or White Liquid 2)

| | |
|---|---|
| Thermoplastic resin (styrene-acrylic type latex, Tg of 70° C., an average particle diameter of 0.15 μm, 30 weight % solid) | 30 weight % |
| Surfactant: Surfinol 465 (manufactured by Nisshin Chemicals Co., Ltd.) | 0.5 weight % |
| Water is added to make the total of 100 weight % | |

(Composition of Colorless or White Liquid 3)

| | |
|---|---|
| Thermoplastic resin (acrylester copolymer, dispersed with a nonionic type dispersant, Tg of 70° C., an average particle diameter of 0.2 μm, 30 weight % solid) | 30 weight % |
| Diethylene glycol | 15 weight % |
| Surfactant: Surfinol 465 (manufactured by Nisshin Chemicals Co., Ltd.) | 0.5 weight % |
| Water is added to make the total of 100 weight % | |

(Composition of Colorless or White Liquid 4)

| | |
|---|---|
| Vinyblan 602 | 15 weight % |
| Glycerin | 10 weight % |
| Surfactant: Surfinol 465 (manufactured by Nisshin Chemicals Co., Ltd.) | 0.5 weight % |
| Water is added to make the total of 100 weight % | |

(Composition of Colorless or White Liquid 5)

| | |
|---|---|
| Thermoplastic resin (styrene-acrylester copolymer, dispersed with a cationic surfactant, Tg of 63° C., an average particle diameter of 0.3 μm, 30 weight % solid) | 30 weight % |
| Diethylene glycol | 15 weight % |
| Surfactant: Surfinol 465 (manufactured by Nisshin Chemicals Co., Ltd.) | 0.5 weight % |
| Water is added to make the total of 100 weight % | |

<Image Quality>

20 persons were arbitrarily selected as image quality evaluation panelists and visual evaluation of image quality was performed primarily with respect to the test charts and portrait images of a person having been out put. The evaluation was performed by comparing each sample for evaluation with h a photographic image standard sample in which similar images are printed on a conventional color paper (Color Paper Type QAA 7 Glossy-Type, manufactured by Konica Corp.). As for an ink-jet images, also evaluated was the uniformity (absence of image lift) of the image portion and white background.

The evaluation was made according to the ranks described below, by counting the number among 20 panelist persons who have judged the sample image has the same image quality as the image standard sample.

5: The number, who evaluated the image quality of a sample to be the same as that of the photographic image standard sample, was at least 17 persons, 4: The number, who evaluated the image quality of a sample to be the same as that of the photographic image standard sample, was 14-16 persons, 3: The number, who evaluated the image quality of a sample to be the same as that of the photographic image standard sample, was 10-13 persons, 2: The number, who evaluated the image quality of a sample to be the same as that of the photographic image standard sample, was 6-9 persons, 1: The number, who evaluated the image quality of a sample to be the same as that of the photographic image standard sample, is less than 6 persons.

The evaluation results are shown in Table 2.

(Color Bleeding)

Evaluation of color breeding, which is related to an ink absorbing rate, was performed. The evaluation was performed based on the following criteria, by visually observing the generation of color bleeding at image boundaries with respect to band-shaped test charts of Y, M, C, B, G, R and Bk having been printed.

4: Generation of color bleeding at boundaries of all colors were hardly observed, 3: Generation of slight color bleeding at boundaries of one or two colors were observed, 2: Generation of color bleeding at boundaries of several colors were observed, 1: Generation of significant color bleeding at boundaries of several colors were observed.

The evaluation results are shown in Table 2.

(Glossiness)

With respect to images of a black solid portion and a white background portion in the evaluated samples, a clarity (gloss value: C value percent) at a reflection of 60 degree and at an optical wedge of 2 mm were measured by use of Image Clarity Meter ICM-1DP (produced by Suga Test Instrument Co., Ltd.). Evaluation was carried out based on the following criteria.

4: C value percent is at least 61,

3: C value percent is 60-51

2: C value percent is 50-41

1: C value percent is at most 40

Among above evaluation ranks, ranks 4 and 3 were judged to be preferable for practical use.

The evaluation results are shown in Table 2.

TABLE 2

| | | | Colorless or white liquid | | | | *1 | | | | Volume of liquid droplet | |
|---|---|---|---|---|---|---|---|---|---|---|---|---|
| Image | Recording medium | Ink | Type | Supply method | Supply timing | Supplied portion | Max. | Min. | *2 | *3 | Recording ink (pl) | Colorless or white liquid (pl) |
| 1 | 1 | *4 | — | — | — | — | 22 | 0 | — | — | | — |
| 2 | 3 | *4 | *6 | Bar coating | *12 | *14 | 25 | 3 | 4 min. | 0 | | — |
| 3 | 3 | *4 | *7 | Spray | *12 | *14 | 25.5 | 3.5 | 2 min. | 0.2 | | — |
| 4 | 3 | *4 | *7 | Nozzle | *12 | OD ≦ 0.5 | 22 | 2.5 | 1 min. | 0.2 | 6 | 6 |
| 5 | 3 | *4 | *8 | Nozzle | *12 | OD ≦ 0.5 | 22 | 4 | 1 min. | 0.9 | 6 | 6 |
| 6 | 3 | *4 | *8 | Nozzle | *12 | *15 | 22 | 3 | 1 min. | 0.9 | 6 | 6 |
| 7 | 2 | *4 | *8 | Nozzle | *12 | OD ≦ 0.5 | 22 | 2 | 1 min. | 0.9 | 6 | 6 |
| 8 | 1 | *4 | *7 | Nozzle | *12 | *15 | 22 | 3 | 1 min. | 0.2 | 6 | 6 |
| 9 | 3 | *5 | *7 | Nozzle | *12 | *15 | 20 | 2 | 1 min. | 0.1 | 6 | 6 |
| 10 | 3 | *5 | *8 | Nozzle | *12 | *15 | 20 | 2 | 1 min. | 0.4 | 6 | 6 |
| 11 | 1 | *5 | *7 | Nozzle | *12 | *15 | 20 | 2 | 1 min. | 0.1 | 6 | 6 |
| 12 | 3 | *4 | *7 | Nozzle | *13 | *15 | 22 | 4 | 30 sec. | 0.2 | 6 | 40 |
| 13 | 3 | *4 | *8 | Nozzle | *13 | OD ≦ 0.5 | 22 | 4 | 30 sec. | 0.9 | 6 | 40 |
| 14 | 3 | *4 | *9 | Nozzle | *13 | OD ≦ 0.5 | 22 | 3.5 | 30 sec. | 1.2 | 6 | 40 |
| 15 | 3 | *4 | *7 | Spray | *12 | *14 | 26.5 | 4.5 | 1 min. | 0.2 | 6 | — |
| 16 | 2 | *4 | *8 | Nozzle | *12 | OD ≦ 0.5 | 22 | 1.6 | 1 min. | 0.9 | 6 | 6 |
| 17 | 3 | *4 | *7 | Nozzle | *12 | *15 | 22 | 3 | 6 min. | 0.2 | 6 | 6 |
| 18 | 3 | *4 | *10 | Nozzle | *13 | *15 | 22 | 4 | 30 sec. | 5.3 | 6 | 6 |
| 19 | 3 | *4 | *11 | Nozzle | *13 | *15 | 22 | 4 | 30 sec. | 10.9 | 6 | 6 |
| 20 | 3 | *5 | *11 | Nozzle | *12 | *15 | 20 | 2 | 1 min. | 8.9 | 6 | 6 |

| | | | | Glossiness | |
|---|---|---|---|---|---|
| Image | Recording medium | Image quality | Color bleeding | Black solid | White background |
| 1 | 1 | 2 | 2 | 2 | 1 |
| 2 | 3 | 3 | 3 | 4 | 2 |
| 3 | 3 | 3 | 3 | 4 | 2 |
| 4 | 3 | 4 | 4 | 4 | 3 |
| 5 | 3 | 5 | 4 | 4 | 3 |
| 6 | 3 | 5 | 4 | 4 | 3 |
| 7 | 2 | 4 | 3 | 4 | 3 |
| 8 | 1 | 3 | 2 | 2 | 3 |
| 9 | 3 | 3 | 4 | 4 | 3 |
| 10 | 3 | 3 | 4 | 4 | 3 |
| 11 | 1 | 2 | 2 | 2 | 2 |
| 12 | 3 | 4 | 4 | 4 | 3 |
| 13 | 3 | 5 | 4 | 4 | 3 |
| 14 | 3 | 5 | 4 | 4 | 3 |
| 15 | 3 | 3 | 2 | 4 | 2 |
| 16 | 2 | 3 | 3 | 4 | 2 |
| 17 | 3 | 3 | 2 | 2 | 2 |
| 18 | 3 | 3 | 4 | 4 | 3 |

TABLE 2-continued

| | | | | | |
|---|---|---|---|---|---|
| 19 | 3 | 3 | 4 | 4 | 2 |
| 20 | 3 | 2 | 4 | 4 | 2 |

*1; Total volume (recording ink + a colorless or white liquid)
*2; Time duration to fixing after a colorless or white liquid is supplied
*3; Absorbance change after mixing of recording ink and a colorless or white liquid
*4; Pigment ink 1
*5; Dye ink 1
*6; Pure water
*7; Liquid 1
*8; Liquid 2
*9; Liquid 3
*10; Liquid 4
*11; Liquid 5
*12; After ink ejection
*13; Simultaneous
*14; Whole surface
*15; White background

Effects of the Invention

Glossiness of the white background portion has been improved without causing deterioration of image quality nor color bleeding when being compared with the comparative image, by supplying a colorless or white liquid on the white background of this invention, and obtained have been images, in which uncomfortable feeling due to image density differences is depressed, by further supplying a colorless or white liquid on the portion having an image density of at least 0.5.

As a supplying method of a colorless or white liquid, preferable is to supply employing a nozzle because of no contamination of surroundings, and it has been confirmed that specifically preferable is to supply the liquid simultaneously with recording ink also with respect to recording speed. Further, comparison between image 3 and 15 has made it clear that color bleeding was deteriorated when the total amount of recording ink and a colorless or white liquid was over 26 ml. Further, it has become clear that image 16,in which the total amount of recording ink and colorless or white liquid was at most 2 ml, was inferior to image 7 with respect to glossiness improvement of the white background.

Further, it is clear from the results of image 17 that glossiness in a black solid portion is decreased when the time duration before fixing after supplying a colorless or white liquid is over 5 minutes. Further, in the case of supplying a colorless or white liquid from an ink-jet nozzle, to supply a colorless or white liquid as a large liquid drop as in formation of images 12-14 has been proved to exhibit a faster image formation speed as well as to be superior causing no deterioration of such as image quality.

Further, with respect to images 18, 19 and 20,in which absorbance changes after mixing of recording ink and a colorless or white liquid were relatively large, streak roughness sometimes caused in the images when these images were continuously formed. This was not observed in other image samples, and it has been proved that absorbance change after mixing of recording ink and a colorless or white liquid is preferably less than 5%.

What is claimed is:

1. A method of forming an ink-jet image comprising the steps of:

(i) ejecting an ink-jet recording ink from an ink-jet nozzle to form the ink-jet image on a surface of an ink-jet recording medium; and (ii) ejecting a colorless or white liquid containing a thermoplastic resin on a portion of said surface of the recording medium having an image density of not more than 0.5, from an ink-jet nozzle, so that a total amount of the recording ink and colorless or white liquid ejected on a unit area is at least 2 ml/$m^2$ and less than 26 ml/$m^2$ based on the image density of the ink-jet image detected prior to the step of ejecting the ink-jet recording ink.

2. The image forming method described in claim 1, wherein a colorless or white liquid contains the water-soluble organic solvent.

3. The image forming method described in claim 1, wherein the ink-jet recording ink is pigment ink.

4. The image forming method described in claim 1, wherein the nozzle for ejecting the ink-jet recording ink and the colorless or white liquid is provided and the ink-jet recording ink and the colorless or white liquid are simultaneously supplied from the nozzle.

5. The image forming method described in claim 1, wherein the recording medium is transported into a fixing process within 5 minutes after the ejection of the colorless or white liquid.

6. The image forming method described in claim 1, wherein an absorbance change when the ink-jet recording ink and the colorless or white liquid are mixed, based on the absorbance immediately after the mixing is less than 5%.

7. The image forming method described in claim 1, wherein a volume of the ink droplet of the colorless or white liquid is larger than a volume of the ink droplet of recording ink when recording ink and the colorless or white liquid are ejected.

8. A method of forming an ink-jet image comprising the steps of:

(i) ejecting an ink-jet recording ink from an ink-jet nozzle to form the ink-jet image on a surface of an ink-jet recording medium; and (ii) ejecting a colorless or white liquid containing a thermoplastic resin on a portion of said surface of the recording medium having no image, from an ink-jet nozzle, so that a total amount of the recording ink and colorless or white liquid ejected on a unit area of said surface is at least 2 ml/$m^2$ and less than 26 ml/$m^2$ based on the image density of the ink-jet image detected prior to the step of ejecting the ink-jet recording ink.

* * * * *